United States Patent

Chelminski

[15] 3,653,460

[45] Apr. 4, 1972

[54] SEISMIC ENERGY WAVESHAPE CONTROL APPARATUS AND METHOD

[72] Inventor: Stephen V. Chelminski, West Redding, Conn.

[73] Assignee: Bolt Associates, Inc., Norwalk, Conn.

[22] Filed: Nov. 14, 1969

[21] Appl. No.: 876,861

[52] U.S. Cl. .......................................................... 181/.5 H
[51] Int. Cl. ............................................................. G01v 1/14
[58] Field of Search ................................................ 181/.5 H

[56] References Cited

UNITED STATES PATENTS

| 3,310,128 | 3/1967 | Chelminski | 181/0.5 |
| 3,493,072 | 2/1970 | Johnston | 181/0.5 |

*Primary Examiner*—T. H. Tubbesing
*Assistant Examiner*—N. Moskowitz
*Attorney*—Robertson, Bryan, Parmelee & Johnson

[57] ABSTRACT

Seismic energy wave-shape control apparatus and method in which the waveshape of the acoustical waves generated in the water by the use of submerged airgun seismic sources can be controlled and selected by the survey crew to provide the waveshape which is most desirable for use under the conditions being encountered as the survey is being carried out. The pressurized gas holding charge container is provided with a plurality of chambers such that an initial abrupt flow of pressurized gas as shown at 50 in FIG. 2 occurs from a primary chamber and passes out through the discharge ports into the surrounding water with explosive-like abruptness. Delayed after-flow of pressurized gas as shown at 52 in FIG. 2 then occurs from a secondary chamber for reducing the relative magnitude and changing the waveform of the second pressure peak P2. The relative volumes of the primary and secondary chambers are conveniently changeable by detaching the casing and shifting the position of a removable barrier, thus obtaining differing waveshapes as seen by comparing FIGS. 6; 7; and 8 with FIG. 5. If desired a tertiary chamber may be utilized to provide further changes in the waveshape.

15 Claims, 8 Drawing Figures

Patented April 4, 1972

INVENTOR.
Stephen V. Chelminski
BY
Robertson, Bryan, Parmelee & Johnson
ATTORNEYS.

Patented April 4, 1972

20 MILLISECONDS BETWEEN EACH VERTICAL LINE

20 MILLISECONDS BETWEEN EACH VERTICAL LINE

INVENTOR.
Stephen V. Chelminski
BY
Robertson, Bryan, Parmelee & Johnson
ATTORNEYS

SEISMIC ENERGY WAVESHAPE CONTROL APPARATUS AND METHOD

This invention relates to the generation of seismic energy in water by the use of seismic sources of the pressurized gas abrupt releasing type and more particularly to method and apparatus for controlling and varying the waveshape of the acoustical waves generated by the release of pressurized gas.

In seismic surveying under water, acoustical energy is generated by the seismic sources submerged in the water and is utilized to investigate subsurface geological conditions and formations. For this purpose one or more of such seismic sources, which are often called airguns, are submerged in the water; compressed air, or other gas or gases under pressure, is fed to the submerged source and temporarily stored therein. At the desired instant the seismic source or sources are actuated, i.e., "fired," and the pressurized gas is abruptly released into the surrounding water. In this manner powerful acoustical waves are generated capable of penetrating deeply into subsurface material to be reflected and refracted therein by the various strata and formations. The reflected or refracted acoustical waves are sensed and recorded to provide information and data about the geological conditions and formations.

It is also possible to submerge such seismic sources in marshland, swamp or mud areas which are infused with sufficient water that the seismic surveying apparatus and method described herein can be used. Accordingly, the term "water" as used in this specification is intended to include marshland, swamp or mud which contain sufficient water to enable such surveying apparatus and method to be used.

The present invention is directed to controlling and varying the waveshape of the acoustical seismic waves which are generated by use of seismic sources of the type abruptly discharging pressurized gas and this invention advantageously enables the seismic survey team to control the waveshape and to select and utilize the desired waveshape which is found to be most effective under the conditions actually encountered by the survey team as they work in the field.

Seismic sources of the type which abruptly discharge pressurized gas into the water, e.g., airguns generate an initial powerful acoustical pulse having a sharply defined first or primary pressure peak. This first pressure peak is indicated at $P_1$ in FIG. 5, which is a plot of pressure in the water as a function of time. The released gas forms an expanding gas bubble. As the bubble expands its internal pressure decreases, and in a brief time the bubble begins to collapse due to the pressure of the surrounding water. The bubble contracts until it is of relatively small size and its internal pressure has risen to a relatively high value, at which time a second pressure peak is generated in the surrounding water, for example as indicated at $P_2$ in FIG. 5.

These expansion-contraction cycles continue in decreasing intensity as the bubble energy is dissipated in the surrounding water. As explained in U.S. Pat. No. 3,371,740 issued to George B. Loper and assigned to Mobil Oil Corporation, the secondary pressure pulses are objectionable in that they are reflected from subsurface interfaces in a manner similar to that of the primary pressure pulse, and the arrival of the reflected secondary pressure pulse tends to mask or obscure the desired event on the seismic records. Furthermore, the secondary pressure pulses may be directly transmitted to the recording system at the same time as the reflected primary pulse arrives, thereby further confusing the records.

It is an object of the present invention to provide unique and novel apparatus and method enabling control of the waveshape and selection of the desired waveshape of the acoustical waves generated in the surrounding water by such seismic sources. FIGS. 6, 7 and 8 show various waveshapes obtainable by utilization of the present invention.

In accordance with the invention in one of its aspects the charge container of the seismic source is provided with a plurality of chambers for containing pressurized gas. A primary one of these chambers communicates directly with the abrupt release means providing an initial abrupt flow of the pressurized gas from the primary chamber through the discharge port into the surrounding water after actuation. A secondary one of these chambers is separated from the primary chamber by a barrier and gas flow delay means permits a delayed flow of pressurized gas to pass from the secondary chamber into the primary chamber after actuation of the release means, providing a delayed after-flow of pressurized gas into the primary chambers and thence through the discharge port controlling the waveshape of the acoustical waves generated in the water.

In a preferred embodiment, the barrier means between the primary and secondary chambers is adjustable in position for changing the relative volumes of the primary and secondary chambers to vary the relative amounts of the pressurized gas in the initial abrupt flow and in the delayed after-flow for producing various waveshapes of the seismic energy being transmitted into the water.

The present invention in certain of its aspects provides a novel method of operating a seismic source in under water seismic surveying including the steps of providing a plurality of charge-containing chambers in the seismic source of predetermined relative sizes, feeding the pressurized gas into each of said chambers, initially allowing the pressurized gas to escape freely from one of the chambers to provide an initial abrupt release of pressurized gas from that chamber through the discharge port upon each actuation of the release means, and delaying the escape of pressurized gas from another of the chambers to provide a subsequent delayed after-flow of pressurized gas from that chamber through the discharge port upon each actuation of the release means to damp and diminish the second pressure peak generated in the water by the initial abrupt release.

The various aspects, features and advantages of the seismic energy wave shape control apparatus and method of the present invention will be more fully understood from a consideration of the following detailed description in conjunction with the accompanying drawings, in which.

Figure 5:
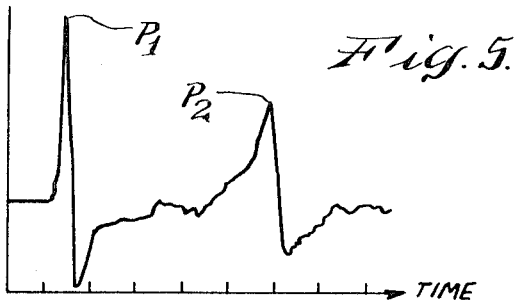

FIG. 5 is a plot of the instantaneous pressure, plotted as a function of time, occurring in the water at a distance of 50 feet from a prior art airgun seismic source during the actuation, i.e., "firing" of the source. This plot indicates the waveshape of the acoustical seismic waves which are typically generated by such a source; the waveshape has a first pressure peak $P_1$ and a second pressure peak $P_2$.

Figure 6:
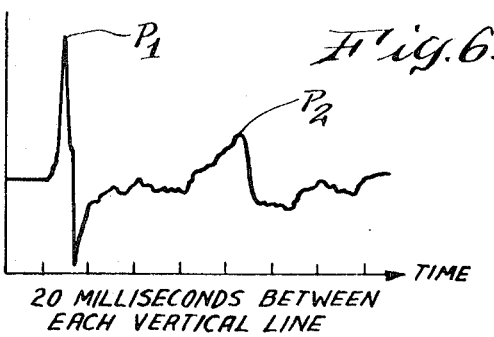

FIG. 6 is a plot of the instantaneous pressure, plotted as a function of time, occurring in the water at the same distance from an airgun seismic source of the same overall size utilizing the present invention to control the waveshape of the acoustical seismic waves generated in the water. It is seen that the magnitude of the second pressure peak $P_2$ in FIG. 6 is substantially reduced relative to $P_1$; the shape of $P_2$ is changed; and it occurs relatively closer in time to $P_1$.

Figure 7:
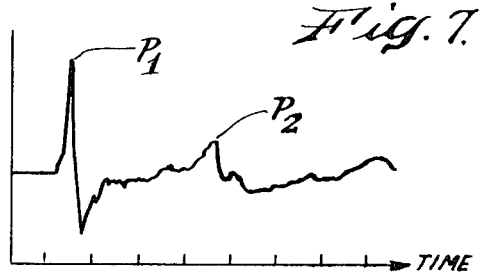

FIG. 7 is a plot of instantaneous pressure as a function of time made under conditions similar to FIG. 6, utilizing the present invention to control the waveshape and employing an air gun in which the volume of the secondary chamber is increased and the volume of the primary chamber is reduced as compared with the airgun used to make the plot of FIG. 6. Also, the size of the gas-flow delaying orifice has been decreased from the size used in making the plot of FIG. 6. It is seen that the magnitude of the second pressure peak $P_2$ in FIG. 7 is further reduced relative to $P_1$; its shape is further changed and it occurs relatively closer in time to $P_1$ than in FIG. 6.

Figure 8:
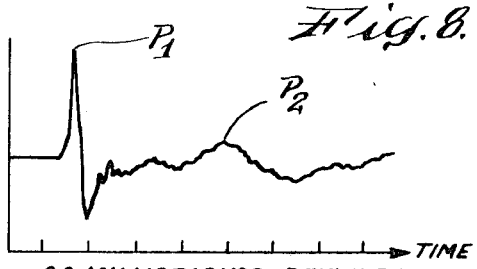

FIG. 8 is a plot of instantaneous pressure as a function of time made under conditions similar to FIGS. 6 and 7, utilizing the present invention to control the waveshape and employing an airgun in which the volume of the secondary chamber is further increased and the volume of the primary chamber is further reduced as compared with the airguns used to make the plots of FIGS. 6 and 7. In making this plot the size of the gas-flow delaying orifice was increased from that used in connection with FIG. 6. It is to be noted that the magnitude of the second pressure peak $P_2$ is still further reduced relative to $P_1$, and $P_2$ is further broadened out, thus eliminating more of the high frequency components from the portion of the waveshape in the region indicated as $P_2$ in FIG. 8.

Figures 1, 2:
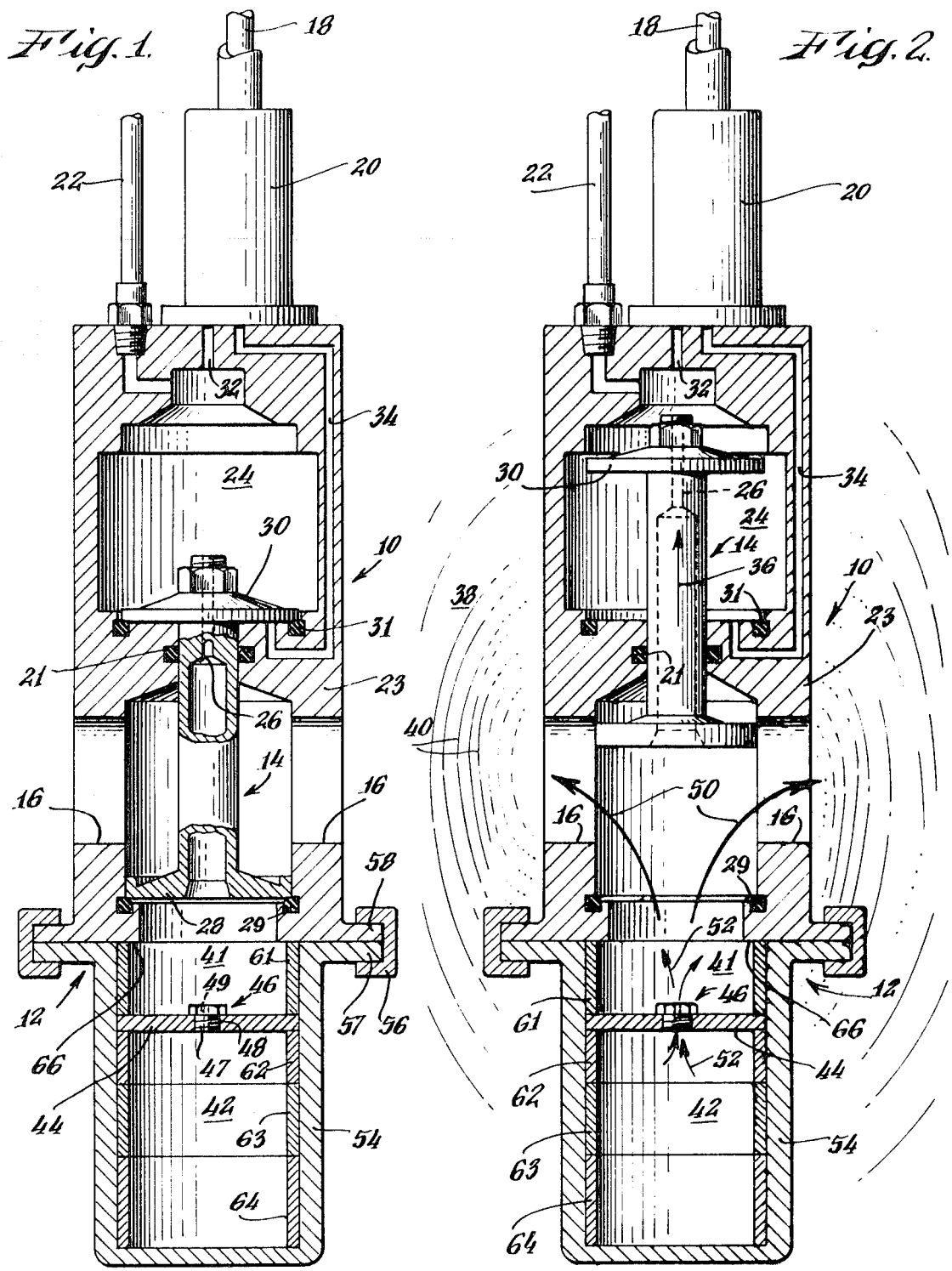
FIG. 1 is a longitudinal sectional view of an air gun seismic source charged with pressurized gas.
FIG. 2 is a longitudinal sectional view of the same source after it has been actuated to abruptly release pressurized gas into the surrounding water.

Referring to FIGS. 1 and 2 of the drawings in greater detail, the airgun seismic source 10 includes pressurized gas charge containing means 12 adapted to hold gases therein under high pressure. It includes release means 14 which can be actuated to abruptly release the pressurized gases through the discharge ports 16 to provide an explosive-like abrupt release of the pressurized gases in response to an electrical control signal sent through and insulated electrical cable 18 to a solenoid operated valve 20. The release means 14 can slide relative to a seal 21 mounted in the body 23 of the airgun 10.

In operation the airgun seismic source 10 is submerged, and it is noted that the plots shown in FIG. 5 through 8 were made with airgun sources submerged at a depth of 30 feet.

To supply gas under high pressure to the seismic source 10, a suitable supply is used. In the apparatus which is being shown in FIG. 1 and 2 as being an illustrative example of a preferred embodiment of the present invention the source 10 is being supplied with compressed air at a pressure in the range from 200 to 2,000 pounds per square inch, gauge pressure. This compressed air is fed down to the airgun 10 through a high pressure hose line 22 into a control chamber 24, and the compressed air also passes through an axial passage 26 in the release means 14 so as to enter and fill the charge containing means 12.

The release means 14 includes a first piston 28 engagable with a seal 29 for retaining the pressured gas in the charge containing means 12. The release means 14 also includes a second piston 30 engageable with a seal 31 for controlling the operation of the release means. The pressure of the gas in the control chamber 24 acting against the piston 30 serves to hold the piston 28 against the seal 29.

When the airgun 10 is actuated by feeding an electrical signal to the solenoid operated valve 20, this valve suddenly opens to allow the pressurized gas to pass through a passage 32 into a passage 34 leading to the opposite surface of the piston 30 from that facing into the control chamber 24. Thus, the holding force of the gas pressure in the control chamber 24 is offset, allowing the pressurized gas in the charge container means 12 to suddenly accelerate the first piston 28 away from the seal 29, as shown by the arrow in FIG. 2, to suddenly open the discharge ports 16.

The abrupt release of pressurized gas through the discharge ports 16 into the surrounding water 38 generates powerful acoustical seismic waves 40, as indicated in FIG. 2. After the airgun has been fired, the pressure of the gas in the central chamber 24 returns the release means 14 to its initial position as shown in FIG. 1 so that the firing of the airgun can be repeated at frequent intervals as may be desired in carrying out a seismic survey.

The foregoing description relates to airguns as known prior to the present invention. If the reader wishes more information about airguns, reference may be made to my U.S. Pat. Nos. 3,249,177 and 3,379,273.

As shown in FIG. 5 a prior art airgun generates acoustical seismic waves in the water having a waveshape which is characterized by a strong second pressure peak $P_2$. As mentioned previously FIG. 5 shows the instantaneous pressure occurring in the water at a distance of 50 feet from an airgun submerged at a depth of 30 feet. The airgun was supplied with compressed air at a pressure of 2,000 p.s.i.g. (pounds per square inch gauge pressure), and it had a single charge containing chamber of a volume of 300 cubic inches. The reason for the generation of the second pressure peak $P_2$ is explained in the introduction.

In order to enable the seismic survey crew to control the waveshape and to select and utilize the desired waveshape which is found to be most effective under the conditions actually encountered by the survey team as they work in the field, the charge containing means 12 for containing the pressurized gas is divided into a plurality of chambers 41 and 42 by a barrier means 44.

The barrier 44 includes gas flow delay means 46 in the form of a threaded hexogonal-head pipe plug 47 (shown more clearly in FIG. 3) which is screwed into a threaded port 48 in the barrier 44. This pipe plug 47 contains an orifice 49 of relatively small diameter extending axially through the plug.

The primary chamber 41 communicates directly with the abrupt release means 14, providing an initial abrupt flow of pressurized gas from the primary chamber 41 through the discharge ports 16 into the surrounding water after actuation of the airgun 10. This initial abrupt flow is indicated by the flow arrows 50.

Upon release of pressurized gas from the primary chamber 41, the gas flow delay means 46 restricts the gas flow from the secondary chamber 42 thereby producing a delayed flow 52 of pressurized gas passing from the secondary chamber 42 into the primary chamber 41 and thence out through the discharge ports 16. This restricted and delayed after-flow of pressurized gas serves to diminish and damp the relative magnitude of the second pressure peak $P_2$ by a controllable and selectable amount as shown in FIG. 6, 7 and 8, and thereby also reducing the amount of higher frequency components associated with the portion of the waveshape near $P_2$.

In order to change the magnitude of the second pressure peak $P_2$ relative to the first pressure peak $P_1$, the charge container means 12 is detached from the airgun body 23, and the barrier 44 is moved to change the relative volumes of the primary and secondary chambers 41 and 42, and also the size of the orifice 49 is changed. The container means 12 includes a casing 54 which is detachably secured by a removable clamping ring 56 engaging a flange 57 on the casing and flange 58 on the body 23. Within the casing 54 are a plurality of removable spacing sleeves 61, 62, 63 and 64 which are of various lengths, and the barrier disc 44 is removable, so that it can be positioned between any pair of these spacing sleeves. The disc 44 can be removed and replaced with a similar disc having a smaller or larger orifice 49.

Figure 3:
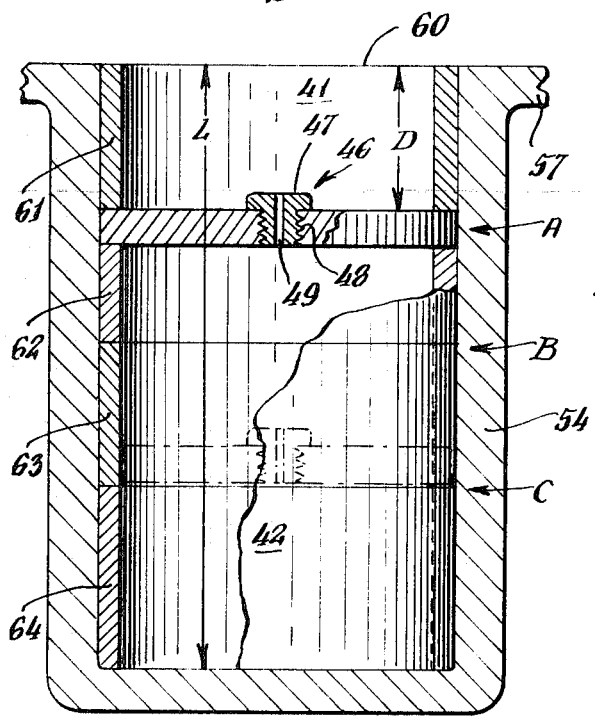
FIG. 3 is an enlarged sectional view of the pressurized gas charge container showing the primary and secondary gas releasing chambers.

For convenience of reference as shown in FIG. 3, when the barrier disc 44 is located between the spacer sleeves 61 and 62, it is said to be in position A. When it is between sleeves 62 and 63 it is in position B, and between sleeves 63 and 64 is position C. The distance between the top face of the barrier disc 44 and the top rim 60 of the detachable casing 54 is indicated as D.

Because the pressures involved are relatively great and the changes in pressure are very sudden during firing it is important that the barrier means 44 and spacer sleeves 61–64 be held securely in place to prevent their rattling. For this purpose the cumulative length of the four sleeves 61–64 plus the thickness of the barrier disc 44 is made exactly equal to the internal length L of the casing 54. There is an internal stop shoulder 66 (FIGS. 1 and 2) in the airgun body 23 which abuts against the uppermost sleeve 61 to hold the whole barrier assember 44, 61–64 securely in place when the casing 54 is attached by the clamp ring 56 to the airgun body 23. The sleeves 61, 62 and 63 have various axial lengths to provide various possible arrangements to adjust the distance D. The interior diameter (I.D.) of the casing 54 is 50.50 inches and its internal length L is 11.15 inches. When all of the spacing sleeves 61–64 and the barrier 44 are removed from the casing 54, it defines a single charge chamber having an over-all volume of 300 cu. in. when it is attached to the airgun body 23.

The plots of FIGS. 6, 7 and 8 were made with the barrier 44 in the positions C, B and A, respectively.

The following chart provides information about the respective plots of FIGS. 5, 6, 7 and 8:

| | FIG. 5<br>Single Charge Chamber 300 cubic inches | FIG. 6<br>Two Charge Chambers Position "C" | FIG. 7<br>Two Charge Chambers Position "B" | FIG. 8<br>Two Charge Chambers Position "A" |
|---|---|---|---|---|
| Distance "D" in Inches | — | 6 ⅝ | 2 ⅝ | 1 ¼ |
| Gas-Flow Delay Orifice Diameter in Inches | — | 0.7 | 0.4 | 0.8 |
| Peak Pressure of $P_1$ (db) relative | 0 | −1.7 | −3.7 | −4.3 |
| Ratio $P_1/P_2$ | 1.8 | 3.2 | 3.8 | 7.0 |
| Time in Milli-seconds from $P_1$ to $P_2$ | 92 | 80 | 66 | 68 |

Thus, it is seen that by increasing the volume of the secondary chamber 42 relative to the volume of the primary chamber and by changing the size of the gas-flow delaying orifice a progressively greater diminishing and damping of the secondary peak $P_2$ is obtained.

It will be understood that other lengths and other numbers of spacing sleeves may be used to locate the barrier disc 44 at any desired axial position within the casing 54. The disc 44 can be removed and replaced with another similar one having a smaller or larger orifice. Alternatively, the pipe plug 47 can be unscrewed and replaced with another one having a smaller or larger flow-restricting orifice 49. The smaller the orifice used for a given size of secondary chamber 42, (or, the larger the volume of the secondary chamber 42 for a given size of orifice the relatively greater delay in the length of time for the after-flow 52 to be completed, and vice versa. In this way the survey crew is enabled to control and select the desired waveshape of the seismic energy being transmitted into the water.

Figure 4:
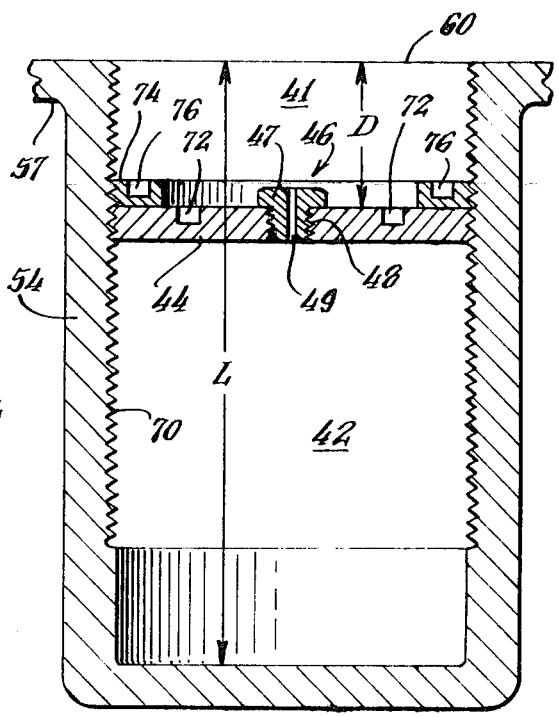
FIG. 4 is an enlarged sectional view of a modified embodiment of a gas charge container similar to that shown in FIG. 3.

In the embodiment shown in FIG. 4 the casing 54 is internally threaded with a helical screw thread 70. The perimeter of the barrier disc 44 is correspondingly threaded so that it can be screwed along the interior of the casing 54 by applying a spanner wrench to the wrench sockets 72. A threaded locking ring 74 having spanner wrench sockets 76 is screwed up tightly against the barrier 44 in the manner of a lock nut to firmly secure the barrier in the desired adjusted position.

It will be understood that a second barrier means 44 can be positioned within the detachable casing 54 for example, with the first barrier at the position A and the second barrier at the position C in FIG. 3 (shown in dashed lines) so as to provide primary, secondary and tertiary chambers for providing further changes in the waveshape.

It will also be understood that the airgun seismic source 10 can be supplied with means for injecting and burning fuel therein as described in the above-mentioned patents so as to provide a marked increase in pressure in the charge chambers prior to firing of the airgun. Accordingly, it is to be understood that the term "airgun" is intended to include those which are supplied with fuel plus compressed air as well as those which are supplied with compressed air or other compressed gas. In certain applications, when operating in a location where compressed air might cause combustion hazards, such as near a gas well, then compressed carbon dioxide or compressed nitrogen or other non-oxidizing gas may be used, and the term "airgun" is intended to include those which are supplied with such pressurized gases.

What is claimed is:

1. In a seismic source adapted to be submerged in water and having a discharge port and also having actuable release means for abruptly releasing pressurized gas from the seismic source through the discharge port into the water for generating powerful acoustical waves in the water, apparatus for controlling the waveshape of the acoustical waves generated in the water comprising:
   a primary chamber in the seismic source for containing pressurized gas, said primary chamber communicating directly with the release means providing an initial abrupt flow of the pressurized gas from said primary chamber through the discharge port upon actuation of the release means,
   a secondary chamber in the seismic source for containing pressurize gas, said secondary chamber being of fixed volume throughout the actuation of said release means,
   stationary barrier means separating said secondary chamber from said primary chamber, and
   gas flow delay means permitting pressurized gas to flow from the secondary chamber into the primary chamber after actuation of the release means providing a delayed after-flow of pressurized gas into the primary chamber and thence through the discharge port controlling the waveshape of the acoustical waves generated in the water by diminishing the second pressure peak that normally would be generated in the water by the initial abrupt release.

2. In a seismic source adapted to be submerged in water as claimed in claim 1, apparatus for controlling the waveshape of the acoustical waves generated in the water, in which:
   said gas flow delay means is a constricted orifice passage extending through said stationary barrier means from said secondary to said primary chamber.

3. In a seismic source adapted to be submerged in water, as claimed in claim 1, apparatus for controlling the waveshape of the acoustical waves generated in the water in which:
   said stationary barrier means is capable of being adjustable in position for changing the relative volumes of said primary and secondary chambers to vary the relative amounts of the pressurized gas in said initial abrupt flow and in said delayed after-flow.

4. In a seismic source adapted to be submerged in water and having a discharge port and also having actuatable release means for abruptly releasing pressurized gas from the seismic source through the discharge port into the water for generating powerful acoustical waves in the water, apparatus for controlling the waveshape of the acoustical waves generated in the water comprising:
   a primary chamber in the seismic source for containing pressurized gas, said primary chamber communicating directly with the release means providing an initial abrupt flow of the pressurized gas from said primary chamber through the discharge port upon actuation of the release means,
   a secondary chamber in the seismic source for containing pressurized gas,
   barrier means separating said secondary chamber from said primary chamber,
   gas flow delay means permitting pressurized gas to flow from the secondary chamber into the primary chamber after actuation of the release means providing a delayed after-flow of pressurized gas into the primary chamber and thence through the discharge port controlling the waveshape of the acoustical waves generated in the water, and
   a tertiary chamber is provided in the seismic source for containing pressurized gas, second barrier means separating said tertiary chamber from said secondary chamber, and second gas flow delay means permitting pressurized gas to flow from the tertiary chamber into the secondary chamber after the release means has been actuated providing a further delayed after-flow of pressurized gas into the secondary chamber and thence through the first gas flow delay means into the primary chamber and thence through the discharge port.

5. In a seismic source adapted to be submerged in water and having a discharge port and also having release means, said release means being movable between a closed position in which the discharge port is blocked by said release means and an open position in which the discharge port is open for releasing pressurized gas from the seismic source through the discharge port into the water for generating powerful acoustical waves in the water, apparatus for controlling the waveshape of the acoustical waves generated in the water comprising:
 a plurality of chambers of predetermined fixed sizes each for containing a charge of pressurized gas in the seismic source,
 a first of said chambers communicating freely with the discharge port when the release means is in the open position providing an initial sudden release of pressurized gas through the discharge port,
 stationary wall means separating a second of said chambers from the discharge port when the release means is in the open position,
 gas flow delay means providing communication between said second chamber and the discharge port when the release means is in the open position providing a delayed after-flow of pressurized gas through the discharge port, controlling the waveshape of the acoustical waves generated in the water.

6. In a seismic source adapted to be submerged in water as claimed in claim 5, apparatus for controlling the waveshape of the acoustical waves generated in the water, in which:
 said gas flow delay means is a flow throttling orifice.

7. In under water seismic surveying using a seismic source having a discharge port communicating with the water in which pressurized gas is fed from the surface down to said source to be contained therein and the seismic source has repetitively actuatable release means for abruptly releasing the pressurized gas from the seismic source through the discharge port into the water for repetitively generating powerful acoustical waves in the water, the method of operating said source which comprises the steps of:
 providing a plurality of charge-containing chambers in the seismic source of predetermined fixed relative sizes,
 initially allowing the pressurized gas to escape freely from a first one of the chambers to provide an initial abrupt release of pressurized gas from that chamber through the discharge port upon each actuation of the release means, and
 restricting the escape of pressurized gas from a second one of the chambers having a fixed volume throughout the actuation of the release means to provide a subsequent delayed after-flow of pressurized gas from that chamber through the discharge port upon each actuation of the release means to damp and diminish the second pressure peak generated in the water by the initial abrupt release.

8. In under water seismic surveying using an airgun seismic source having a discharge port communicating with the water during which pressurized gas is fed from the surface down to said airgun source to be contained therein and the source has repetitively actuatable release means for abruptly releasing the pressurized gas from the source through the discharge port into the water for repetitively generating powerful acoustical waves in the water, the method of operating said source which comprises the steps of:
 providing a plurality of charge-containing chambers of predetermined fixed relative sizes in the seismic source, a second of said chambers being larger than a first of said chambers,
 feeding the pressurized gas into each of said chambers,
 initially allowing the pressurized gas to escape freely from the first of the chambers to provide an initial abrupt release of a predetermined quantity of pressurized gas from that chamber through the discharge port upon each actuation of the release means,
 providing restriction in the escape of pressurized gas from the second larger one of the chambers to provide a subsequent delayed after-flow of a predetermined quantity of pressurized gas from the second chamber greater than that from the first chamber through the discharge port upon each actuation of the release means to diminish the second pressure peak generated in the water by the initial abrupt release.

9. In under water seismic surveying using an airgun seismic source having a discharge port communicating with the water during which pressurized gas is fed from the surface down to said airgun source to be contained therein and the source has repetitively actuatable release means for abruptly releasing the pressurized gas from the source through the discharge port into the water for repetitively generating powerful acoustical waves in the water, the method of operating said source which comprises the steps of:
 providing a plurality of charge-containing chambers in the seismic source,
 feeding the pressurized gas into each of said chambers,
 initially allowing the pressurized gas to escape freely from a first of the chambers to provide an initial abrupt release of pressurized gas from that chamber through the discharge port upon each actuation of the release means,
 providing restriction in the escape of pressurized gas from a second of the chambers to provide a subsequent delayed after-flow of pressurized gas from the second chamber through the discharge port upon each actuation of the release means to diminish the second pressure peak generated in the water by the initial abrupt release, and
 adjusting the relative volumes of said first and second chambers for varying the amount by which the peak pressure of said second pressure peak is diminished relative to the first pressure peak produced in the water by the initial abrupt release, and
 changing the restriction in the escape of pressurized gas from the second chamber for varying the waveshape of the acoustical waves produced in the water.

10. In an airgun seismic source for generating powerful acoustical waves in water including release means for abruptly releasing pressurized gas into the water, apparatus for enabling the user to change the waveshape of the acoustical waves in the water comprising:
 a cylindrical casing adapted to hold pressurized gas to be release and being detachable from the airgun source,
 a plurality of sleeves fitting snugly within the cylindrical casing,
 a barrier disc fitting between one and another of said sleeves,
 said barrier disc having a gas-flow orifice extending therethrough,
 said barrier disc separating the interior of said casing into a primary chamber and secondary chamber for holding the pressurized gas,
 said gas flow orifice providing communication between said primary and secondary chambers in said casing,
 said sleeves and barrier disc being removable from said casing when the casing is detached from the airgun source to enable the relative position of the barrier disc in said casing to be changed for changing the relative sizes of said primary and secondary chambers, thereby to vary the waveshape of the acoustical waves produced in the water.

11. In an airgun seismic source, apparatus for enabling the user to change the waveshape of the acoustical waves as claimed in claim 10 in which said airgun source has a stop shoulder to hold said sleeves and barrier disc securely in position in said casing when the casing is attached to the airgun source.

12. In an airgun seismic source, apparatus for enabling the user to change the waveshape of the acoustical waves as claimed in claim 10 in which said removable sleeves have various axial lengths to provide various possible arrangements to adjust the position of the removable barrier disc relative to the casing.

13. In an airgun seismic source for generating powerful acoustical waves in water including release means for suddenly releasing pressurized gas into the water, apparatus for enabling the user to change the waveshape of the acoustical waves in the water comprising:
- a casing adapted to hold pressurized gas to be release by the release means and said casing being detachable from the airgun source,
- a barrier within said casing separating said casing into primary and secondary chambers,
- said barrier having a gas-flow orifice therein providing communication between said primary and secondary chambers, and
- position adjustment means within the removable casing enabling the position of the barrier to be changed by the user when the casing is detached from the airgun source.

14. In an airgun seismic source, apparatus for enabling the user to change the waveshape of the acoustical waves in the water as claimed in claim 13 in which the barrier position adjustment means are screw threads along the casing wall.

15. In an airgun seismic source, apparatus for enabling the user to change the waveshape of the acoustical waves in the water as claimed in claim 13 in which the barrier position adjustment means are removable sleeves within the casing for holding the barrier in predeterminable position.

* * * * *